US010174972B2

United States Patent
Simross et al.

(10) Patent No.: US 10,174,972 B2
(45) Date of Patent: Jan. 8, 2019

(54) INTERCOOLER BYPASS

(71) Applicant: KAESER KOMPRESSOREN SE, Coburg (DE)

(72) Inventors: Dirk Simross, Höchheim (DE); Andreas Fredenhagen, Coburg (DE)

(73) Assignee: KAESER KOMPRESSOREN SE, Coburg (DE)

( * ) Notice: Subject to any disclaimer, the term of this patent is extended or adjusted under 35 U.S.C. 154(b) by 261 days.

(21) Appl. No.: 14/940,313

(22) Filed: Nov. 13, 2015

(65) Prior Publication Data
US 2016/0138838 A1    May 19, 2016

(30) Foreign Application Priority Data

Nov. 14, 2014  (DE) .................. 10 2014 116 672

(51) Int. Cl.
*F25B 41/00*  (2006.01)
*F25B 7/00*  (2006.01)
(Continued)

(52) U.S. Cl.
CPC .............. *F25B 7/00* (2013.01); *B01D 53/06* (2013.01); *B01D 53/261* (2013.01); *F04B 39/16* (2013.01);
(Continued)

(58) Field of Classification Search
CPC ......... F25B 7/00; B01D 53/06; B01D 53/261; B01D 2258/06; B01D 2257/80; F04B 41/06; F04B 36/16; F04B 49/007
See application file for complete search history.

(56) References Cited

U.S. PATENT DOCUMENTS 4,957,107 A *  9/1990  Sipin ..................... A61M 1/106
                                              128/204.18
5,501,082 A *  3/1996  Tachibana ............... F25B 45/00
                                              62/149
(Continued)

FOREIGN PATENT DOCUMENTS

DE        10117790 A1    10/2002
EP         1249603 A2    10/2002
(Continued)

OTHER PUBLICATIONS

Kamiya et al., Air Compressor, May 15, 2006, JP2006152945A, Whole Document.*
(Continued)

*Primary Examiner* — Larry Furdge
(74) *Attorney, Agent, or Firm* — Panitch Schwarze Belisario & Nadel LLP

(57) ABSTRACT

A compressor system for compressing gases in a multistage compression includes a next-to-last compressor in a flow direction and a last compressor which are connected in series, one or more intercoolers between the next-to-last compressor and the last compressor, and an adsorption dryer connected downstream of the last compressor and designed as a rotation dryer having a rotating adsorption chamber. An inside of the adsorption chamber includes a regeneration sector and a drying sector. The regeneration sector is connected to the last compressor such that the compressed gas stream output from the last compressor is guided in a full stream principle through the regeneration sector. A bypass line which bypasses the intercoolers is situated between next-to-last compressor and last compressor, and includes a setting element to set the gas stream guided via the bypass line and therefore the regeneration entry temperature of the compressed gas in the regeneration sector appropriately.

18 Claims, 6 Drawing Sheets

(51) Int. Cl.
  *B01D 53/06* (2006.01)
  *B01D 53/26* (2006.01)
  *F04B 39/16* (2006.01)
  *F04B 41/06* (2006.01)
  *F04B 49/00* (2006.01)

(52) U.S. Cl.
  CPC ............ *F04B 41/06* (2013.01); *F04B 49/007* (2013.01); *B01D 2257/80* (2013.01); *B01D 2258/06* (2013.01)

(56) References Cited

U.S. PATENT DOCUMENTS

| | | | |
|---|---|---|---|
| 2003/0188542 A1 | 10/2003 | Vertriest | |
| 2008/0010967 A1* | 1/2008 | Griffin | B01D 53/22 60/39.182 |
| 2012/0067205 A1* | 3/2012 | Pendzich | B01D 53/002 95/17 |

FOREIGN PATENT DOCUMENTS

| | | |
|---|---|---|
| EP | 1701037 A1 | 9/2006 |
| EP | 2569585 B1 | 8/2014 |
| JP | S56152726 A | 11/1981 |
| JP | H05106560 A | 4/1993 |
| JP | 2006152945 A * | 6/2006 |
| WO | 2009043123 A1 | 4/2009 |

OTHER PUBLICATIONS

Search Report dated Aug. 3, 2016 in DE Application No. 10-2014019805.7.

Office Action dated Oct. 29, 2015 in DE Application No. 102014116672.8.

Search Report dated Apr. 5, 2016 in EP Application No. 15193507.9.

* cited by examiner

INTERCOOLER BYPASS

BACKGROUND OF THE INVENTION

The present invention relates to a compressor system for compressing gases in a multistage compression and a method for operating a compressor system.

A previously known compressor system for achieving a multistage compression comprises multiple compressors connected in series, specifically an upstream compressor and a last compressor, which defines the highest compressor stage within the multistage compression, one or more intercoolers between upstream compressor and last compressor, and an adsorption dryer, which is connected downstream of the last compressor and which is designed as a rotation dryer and comprises a regeneration sector and a drying sector, wherein the regeneration sector is connected to the last compressor in such a manner that the gas stream output from the last compressor is guided completely in the full stream principle through the regeneration sector of the adsorption dryer.

Such multistage compressor systems or multistage compression methods are known per se, in which, at the last compressor, which defines the highest compressor stage within the multistage compression, an adsorption dryer, which is designed as a rotation dryer and comprises a regeneration sector and a drying sector, wherein the regeneration sector is connected to the last compressor in such a manner that the gas stream output from the last compressor is guided completely in the full stream principle through the regeneration sector of the adsorption dryer.

However, one problem is that a compressed and dried gas stream is to be available at the outlet of the drying sector, which has to be sufficiently dry with respect to an established limiting value. In general, the pressure dewpoint is used as the measure of the dryness of the dried gas and thus for the drying result of the drying process. The pressure dewpoint specifies the temperature to which a compressed gas stream may be maximally cooled, without water vapor contained therein precipitating as condensate or ice. In the drying process provided here, the gas stream exiting from the last compressor is guided completely through the regeneration sector of the adsorption dryer designed as a rotation dryer, so that the compression heat, which occurs in any case, may be used efficiently for desorption of the water previously adsorbed in the adsorption material of the rotation dryer. The adsorption material, which is thus regenerated as extensively as possible in the regeneration sector, is used again in the drying sector for the gas drying after the regeneration.

To be able to ensure sufficient drying, i.e., maintaining a fixed limiting value for the pressure dewpoint, compressed gas of sufficiently high temperature has to be applied to the regeneration sector by the last compressor. The temperature at which the compressed gas exits from the last compressor and enters the regeneration sector is referred to hereafter as the regeneration entry temperature $T_{Ri}$ and, as mentioned, has to be sufficiently high. For the purposes of the following application, the exit temperature from the last compressor $T_{Al}$ is assumed to be equal to the regeneration entry temperature $T_{Ri}$ ($T_{Al}=T_{Ri}$). Even if the compressed gas should cool down slightly between the outlet from the last compressor and the inlet into the regeneration sector, this may thus be neglected in most practical systems. In any case, however, it is to be noted that the regeneration entry temperature $T_{Ri}$ is directly correlated with the exit temperature from the last compressor $T_{Al}$.

If the regeneration entry temperature $T_{Ri}$ is excessively high, this may be linked to various disadvantages. On the one hand, the hazard exists that excessively high temperatures will be applied to downstream components in a connected compressed air system, for which they are not designed, i.e., the permissible operating temperatures of components connected downstream will be exceeded.

On the other hand, an excessively high regeneration entry temperature $T_{Ri}$ is also correlated with a correspondingly higher entry temperature of the gas into the last compressor. The compression of a hotter gas is significantly more inefficient, however, than the compression of a comparatively cooler gas, with the result that the compression process becomes inefficient.

Since boundary conditions, for example, the temperature of coolant media, which are available for cooling of the intercooler or intercoolers, or also the speed and therefore the power of one or more compressors may change under specific operating conditions, the regeneration entry temperature $T_{Ri}$ may therefore firstly also change in its value.

It has thus already been proposed in the prior art, to maintain a specified degree of drying of a compressed gas, to regulate the regeneration entry temperature $T_{Ri}$ to an established value. Such a solution is described, for example, in JP-S56152726. Specifically, a two-stage compression comprising an upstream compressor and a last compressor is proposed therein, wherein an intercooler is provided between the upstream compressor and the last compressor. A regulated cooling water stream is applied to the intercooler provided therein such that the exit temperature of the compressed gas from the last compressor and therefore the regeneration entry temperature $T_{Ri}$ is always kept above a set minimum temperature. Drying is caused in the prior art by a switched dryer to be regenerated in phases. The regeneration of the adsorption dryer, which is designed therein as a switched dryer, is always carried out at at least the established minimum temperature due to the regulation of the cooling water stream applied to the intercooler.

Proceeding from this prior art, an object of the present invention is to propose a compressor system or a method for operating a compressor system, in which the overall energy efficiency is improved in a multistage compression having subsequent adsorption drying of the compressed gas.

BRIEF SUMMARY OF THE INVENTION

The present invention relates to a compressor system for compressing gases in a multistage compression and a method for operating a compressor system.

Specifically, the present invention relates to a compressor system for compressing gases in a multistage compression. The system comprises multiple compressors connected in series, comprising at least one next-to-last compressor in the flow direction and a last compressor, which defines the highest compressor stage within the multistage compression, one or more intercoolers between next-to-last compressor and last compressor, and an adsorption dryer connected downstream of the last compressor, which is designed as a rotation dryer having a rotating adsorption chamber and comprises a regeneration sector and a drying sector inside the adsorption chamber, wherein the regeneration sector is connected to the last compressor in such a manner that the compressed gas stream output by the last compressor is guided in the full stream principle through the regeneration sector of the adsorption dryer, wherein furthermore a bypass line, which bypasses the or at least one intercooler, is situated between the next-to-last compressor and last compressor, in which bypass line a setting element is provided, to be able to set the gas stream guided via the bypass line and therefore the regeneration entry temperature $T_{Ri}$ of the compressed gas into the regeneration sector as needed.

It may thus be provided, for example, that if precisely one intercooler is provided between the next-to-last compressor and the last compressor, the bypass line bypasses this one intercooler. If multiple intercoolers are provided between the next-to-last compressor and the last compressor, it may thus be provided that the bypass line bypasses all, one, or multiple intercoolers, but preferably in each case the last intercooler in the flow direction before the last compressor. Finally, it is also conceivable that the intercooler or, in the case of multiple intercoolers, one intercooler, in particular the last intercooler before the last compressor is only partially bypassed, which could be implemented, for example, in that if the intercooler is designed in the form of a pipe bundle heat exchanger, a third discharge is provided in a jacket of the pipe bundle heat exchanger.

The setting element provided in the bypass line may also be designed in the form of a mixing valve, which is designed for setting, where the bypass line begins or where the bypass line ends, to establish which partial stream is guided via the intercooler and which partial stream is guided via the bypass line. In this embodiment, it is also possible to completely block the partial stream guided via the intercooler.

A rotation dryer in the meaning of the present invention is an adsorption dryer in this case, comprising a drum-shaped adsorption chamber having a plurality of adsorption channels, which contain an adsorption material, wherein a first supply line and a first discharge line are arranged on a first end of the adsorption chamber, and a second supply line and a second discharge line are arranged on a second end of the adsorption chamber, wherein the drum-shaped adsorption chamber is rotatable in relation to the supply and discharge lines, so that the adsorption channels are fluidically connectable in chronological alternation with the first supply line and the second discharge line or the first discharge line and the second supply line. When reference is made in the present application to a rotating adsorption chamber, it is thus clarified that this relates to the relative movement between adsorption material and drying or regeneration sector, which is either brought about in that the adsorption chamber rotates and the supply and discharge lines are stationary, or the adsorption chamber is stationary and the supply and discharge lines rotate.

At the same time, the above-mentioned drying sector and the above-mentioned regeneration sector are defined, wherein the gas is dried in the drying sector and the adsorption material is regenerated in the regeneration sector, wherein the first supply line is designed such that the gas stream to be dried may be supplied as a full stream to the regeneration sector, wherein the second discharge line is connected to the second supply line and therefore forms a connecting line, and wherein regeneration sector and drying sector are connected for serial through flow in succession, such that the gas stream supplied to the drying sector corresponds essentially completely to the gas stream discharged from the regeneration sector, optionally including a gas stream discharged from an optionally still provided cooling sector.

Full stream is to be understood in the present description, in particular, as a fraction of the gas stream of at least 95%, preferably at least 99%, more preferably (essentially) 100%.

When intercoolers are referred to in the present application, it is thus clarified that they are fluidically connected to the next-to-last compressor and the last compressor and are designed and configured for the purpose of cooling the partially compressed gas stream, in particular via a coolant medium. The intercooler is to be understood as a whole as a functional unit, which causes the process step of intermediate cooling in the method. The intercooler may therefore be structurally designed also having a condensate separator, which will be described in greater detail hereafter, integrated in a shared structural unit.

With respect to the method, a method for operating a compressor system for achieving a multistage compression is proposed, comprising multiple compressors connected in series, among them a next-to-last compressor in the flow direction and a last compressor, which defines the highest compressor stage within the multistage compression, and an adsorption dryer connected downstream of the last compressor, which is designed as a rotation dryer and comprises a regeneration sector and a drying sector, wherein the gas stream output by the last compressor is guided in the full stream principle through the regeneration sector of the adsorption dryer, wherein the method is furthermore distinguished in that via the setting of a degree of opening of a bypass line, which entirely or partially bypasses one or more intercoolers provided between next-to-last compressor and last compressor, the regeneration entry temperature $T_{Ri}$ of the compressed gas in the regeneration sector is set appropriately.

Thus, if one or more intercoolers provided between next-to-last compressor and last compressor are entirely or partially bypassed, this means that, on the one hand, in the case of multiple intercoolers, not all intercoolers have to be bypassed, but rather only some or even only one single intercooler, in particular a last intercooler before the last compressor in the flow direction, may be bypassed. On the other hand, however, it is additionally also possible that, if one or more intercoolers are provided, a single intercooler is also only partially bypassed.

When a degree of opening of the bypass line is referred to above, the degree of opening of the bypass line may thus also be set via a mixing valve, which, where the bypass line begins or where the bypass line ends, sets or fixes which partial stream is guided via the bypass line and which partial stream is guided via the intercooler. In this embodiment, it is also possible to completely block the partial stream guided via the intercooler.

When reference is made in the present application to the adsorption dryer being connected downstream of the last compressor, the most direct possible connection is thus sought, to also be able to use the heat of the compressed gas stream flowing out of the last compressor directly for the regeneration, as much as possible without large heat losses. Interconnecting components such as a pulsation damper, sensors, valves, or other components, which do not decisively influence the temperature of the compressed gas, may nonetheless be provided if necessary or advantageous.

A core concept of the present invention is based on the consideration that an established degree of drying of the compressed gas may be ensured using a relatively high established regeneration entry temperature $T_{Ri}$, but a high regeneration entry temperature $T_{Ri}$ may be disadvantageous for energetic reasons. In situations, for example, in which the intake gas to be compressed is relatively dry, the established degree of drying may also be maintained using a lower regeneration entry temperature $T_{Ri}$. At the same time, however, the regeneration entry temperature $T_{Ri}$ may then be made lower, so that the regeneration entry temperature $T_{Ri}$ is set variably, and appropriately, according to the present invention.

Appropriate setting is thus understood as the situation-related establishment of the value $T_{Ri}$ depending on the requirement for the gas stream to be provided or the optimization aspect. High values for $T_{Ri}$ result in increased efficiency of the drying process, but also mean more inefficient compression of the gas stream in the last compressor and are accompanied by a lower overall efficiency of the system. The appropriate setting and therefore the establishment of the $T_{Ri}$ value may furthermore be dependent on an array of technical and external factors, for example, the temperature and humidity of the incoming gas stream, the operating temperature limits of the various components of the system, the speed of the compressors, the temperature of the coolant medium, or the ambient temperature of the system. The appropriate setting and therefore the establishment of the regeneration entry temperature $T_{Ri}$ may thus comprise current state conditions of various media, such as the temperature of the coolant medium, the temperature and/or humidity of the gas which is to be compressed, is partially compressed, or is compressed. In addition to the consideration of the currently provided values, alternatively or additionally, values from the past—for example, up to 30 minutes previously—may also be taken into consideration in the appropriate setting of the regeneration entry temperature $T_{Ri}$.

The appropriate setting of the regeneration entry temperature $T_{Ri}$, which corresponds to the exit temperature of the last compressor $T_{Al}$ or is at least correlated thereto, thus includes variable setting of the exit temperature $T_{Al}$ of the last compressor. In contrast to the prior art, an established exit temperature of the last compressor $T_{Al}$, which corresponds to the entry temperature into the regeneration sector, is not permanently predefined, but rather the exit temperature of the last compressor $T_{Al}$ or the regeneration entry temperature in the regeneration sector $T_{Ri}$ of the adsorption dryer is moved variably according to the present invention.

The variable setting may thus indirectly or directly take into consideration the state conditions of the intake gas. For example, in the case of a relatively humid intake gas, the exit temperature $T_{Al}$ of the last compressor or the regeneration entry temperature $T_{Ri}$ into the regeneration sector could be raised or, in the case of a relatively dry intake gas, the exit temperature $T_{Al}$ of the last compressor or the regeneration entry temperature $T_{Ri}$ could be moved downward.

Because the regeneration entry temperature $T_{Ri}$ is set appropriately, if needed a lower regeneration entry temperature $T_{Ri}$ may be used, and the established degree of drying may nonetheless be maintained, than if the regeneration entry temperature $T_{Ri}$ is established constantly at such a value (such a high value) that the established degree of drying is maintained in all conceivable cases.

In contrast, if the regeneration entry temperature $T_{Ri}$ has to be increased in specific cases, in which, for example, the humidity of the intake gas is very high, this could fundamentally also be carried out using a heating unit which may be switched in, and which heats up the compressed gas before entry into the regeneration sector. In fact, such a solution is already described in International Application Publication No. WO 2009-043123 A1. However, in comparison to a separately provided auxiliary heating unit, the procedure proposed here, namely guiding a part of the precompressed gas before the last compressor past the intercooler via a bypass line and finally therefore already supplying precompressed gas of higher temperature to the last compressor, is significantly more efficient, and is so both from energetic considerations and also from structural considerations. In a structural aspect, a heating unit to be provided separately is not required. From energetic considerations, the additional energy to be applied to increase the regeneration entry temperature should be approximately two to four times as high in the solution via a heating unit as the additional energy expenditure for the compression of the gas, which is increased in its temperature, in the last compressor or above all in the next-to-last compressor. By opening a cross section in the bypass line, the temperature of the partially compressed gas rises between the unification point and the last compressor. Due to this higher temperature, the pressure rises between the next-to-last compressor and the last compressor, which may also be referred to as the intermediate pressure between next-to-last compressor and last compressor. Therefore, however, the pressure ratio for the next-to-last compressor also rises; i.e., the next-to-last compressor has to compress the gas to the intermediate pressure which is now higher, so that the energy expenditure for the next-to-last compressor rises.

The principle of acting on the regeneration entry temperature $T_{Ri}$ by way of a setting element provided in a bypass line is already known from JP 5106560. However, only a part of the hot compressed gas is used for regenerating the adsorption material therein. The temperature of all of the compressed hot gas is raised by the bypass line, however, and therefore the power consumption is also increased of the compressor system for the compression of the entire gas stream. The temperature increase purchased by the elevated power consumption of the last compressor is not used for a part of the compressed gas, however, but rather this part is guided through a cooler without using the heat. This method is thus relatively inefficient. In addition, appropriate control of the regeneration entry temperature $T_{Ri}$, is not performed in any of the above-mentioned documents. This results in unnecessarily high power consumption of the compressor system. A pressure dewpoint is frequently used, which is significantly lower than necessary. The method is also relatively inefficient in this way.

Finally, a switched dryer is provided in the mentioned prior art. Due to the long time interval between the regeneration of a container and drying of compressed gas using this container, it would require an unacceptably long reaction time to act on the regeneration temperature in the event of excessively high humidity of the compressed gas. Appropriate control of the regeneration entry temperature therefore in fact already cannot be implemented using the system proposed therein for design reasons.

In one preferred embodiment of the present invention, the compressor system is designed to achieve a two-stage compression, so that the upstream compressor in the flow direction defines the lowest compressor stage. Although a two-stage compression represents a frequent application, it is to be noted here that the present invention is not restricted to the application in a two-stage compression, of course, but rather the compressor system may be designed to achieve a three, four, five, or higher stage compression. The method may also be applied to a three, four, five, or higher stage compression. For example, in a four-stage compression, viewed in the flow direction, the third compressor is the next-to-last compressor and the fourth compressor is the last compressor in the meaning of the present invention. In a five-stage compression, viewed in the flow direction, the fourth compressor is the next-to-last compressor and the fifth compressor is the last compressor. For clarification, it is to be noted that the last compressor, viewed in the flow direction, refers to the last compressor of the multistage compression before transfer of the gas stream to the adsorption dryer; i.e., before the entry into the regeneration sector.

In a further preferred embodiment, the setting element is designed for continuous or steady setting of the gas stream. Furthermore, the setting element may also appropriately completely block the bypass line and/or completely open a line cross section of the bypass which is supplied to the setting element. In all above-mentioned embodiments, it is conceivable to permit setting in discrete steps or continuously or steadily. A release of the cross section in discrete steps for the through flow through the bypass line could also be achieved by connecting multiple shutoff flaps in parallel. The setting element could also be installed directly at the branching point 24 or at the unification point 21 of the bypass line 14 in the form of a distribution or mixing valve. In one specific possible embodiment, the setting element may be a proportional valve.

In one particularly preferred embodiment, the setting element is coupled to an actuator, which is designed for the electrical, pneumatic, or hydraulic actuation of the setting element.

In one specific conceivable embodiment, the actuator is driven by a motor, for example.

In a further preferred embodiment, an above-mentioned condensate separator is provided, which is arranged downstream of the intercooler or intercoolers and upstream of a unification point, at which the gas stream guided via the bypass line is unified with the gas stream guided via the intercooler or intercoolers before entry into the last compressor. The condensate separator may also be formed integrated with the intercooler in a shared modular unit. Although embodiments are also conceivable in which intercoolers between an upstream and a downstream compressor or a next-to-last compressor and a last compressor only cause cooling of the compressed gas which is supplied to the downstream or last compressor, providing a condensate separator appears advantageous in particular if the compressed gas is cooled down enough that the moisture or water vapor contained therein may be partially condensed out and separated. In this way, it is possible to remove a part of the water located in the intake gas of the next-to-last compressor from the gas stream, before this gas stream is used for regeneration of the adsorption material. A better drying result may thus be achieved, or the desired drying result may be achieved at a lower regeneration entry temperature $T_{Ri}$ and thus lower power consumption, in particular of the last compressor. For clarification, it is to be noted that the condensate separator is arranged in a connecting line between intercooler and unification point; i.e., the gas stream which is also guided via the intercooler flows through it.

In one particularly preferred embodiment, furthermore a control unit is provided, which is operationally connected to the setting element or an actuator associated with the setting element, to act on the setting element appropriately, in particular as a function of the current state data of the gas to be compressed or the compressed gas, for example, the humidity of the intake gas and/or the humidity of the compressed gas output from the drying sector. The control unit may thus output a control signal to the setting element or the actuator, which is operationally connected to the setting element, to move the setting element into a specific, desired position.

In a further preferred embodiment, the control unit may also comprise one or more signal inputs, in particular a signal input for an exit temperature at or downstream of the last compressor, a signal input for at least one signal characterizing the drying process, such as the entry temperature into the drying sector, the pressure dewpoint of the compressed gas output from the drying sector, and/or for a coolant medium temperature, a signal input for at least one signal characterizing the compression process of the last compressor, such as a gas entry temperature at this compressor, a gas exit pressure of this compressor, a gas entry pressure of this compressor, an operating temperature of this compressor or downstream components, and/or a signal input for at least one signal characterizing the compression process of the next-to-last compressor, such as a gas exit temperature of this next-to-last compressor or a gas exit pressure of this next-to-last compressor, a signal input for the speed of one or more compressors, and/or a signal input for the speed of the adsorption chamber. In this case, a signal input refers to a data input, via which the signal unit may directly receive and/or process measurement data (raw data), processed measurement data, digitized measurement data, or data which correspond to the respective measurement parameters and are obtained directly or indirectly. In some cases, the signal input may also be a "virtual" signal input, such that the data acquired thereon are available directly or indirectly to the control unit.

In one possible embodiment, the compressor system may comprise a pressure dewpoint sensor, which is designed to acquire the pressure dewpoint of the compressed gas output at the drying sector and is operationally connected to the control unit such that the setting element is set via the control unit as a function of the pressure dewpoint of the compressed gas output at the drying sector. Such a construction appears particularly simple and advantageous, since in the event of noticeable worsening of the degree of drying of the compressed gas output at the drying sector, it is possible to react and act on the setting element such that the regeneration entry temperature is increased. The regeneration entry temperature may therefore be set to an energetically advantageous value on the basis of the degree of drying of the output compressed gas.

The control unit may furthermore be designed such that it is operationally connected to a data memory for the operational data of the adsorption dryer. It is unimportant in this case whether the data memory for the operational data of the adsorption dryer is formed completely or partially on the adsorption dryer, on a control device for the adsorption dryer, in the present control unit, in a higher-order central control unit, or in another suitable manner.

In one possible, optional embodiment, it may be provided that the control unit is also operationally connected to the compressors and, for example, activates the compressors, in particular sets the speed thereof and/or captures the operational data thereof, in particular the speed thereof.

In one advantageous embodiment, the method according to the present invention provides that the exit temperature $T_{Al}$ of the last compressor or the regeneration entry temperature $T_{Ri}$ into the regeneration sector is set such that or with the goal that the compressed gas exiting from the drying sector maintains an established minimum limiting value for the degree of drying or the pressure dewpoint of the compressed gas withdrawn from the drying sector does not exceed an established limiting value for the pressure dewpoint. With the establishment of a limiting value for the pressure dewpoint, it may nonetheless be possible that the actual pressure dewpoint of the gas exiting from the drying sector temporarily, but not permanently, exceeds this limiting value in individual cases.

In one preferred refinement, the limiting value for the pressure dewpoint may be set or established by the user at a constant value or may be set case-by-case in dependence on the application.

Preferably, the setting of the exit temperature $T_{Ai}$ or the entry temperature $T_{Ri}$ into the regeneration sector may furthermore be set so that not only is a degree of drying of the compressed gas withdrawn from the drying sector maintained with regard to a minimum degree of drying, but rather also that energetically disadvantageous overdrying is avoided.

In a further preferred embodiment of the method according to the present invention, it is provided that the appropriate setting of the regeneration entry temperature $T_{Ri}$ in the regeneration sector is performed continuously, quasi-continuously, or at intervals as a function of the specific state data of the gas to be compressed or the compressed gas, for example, the humidity of the intake gas and/or the humidity of the compressed gas output from the drying sector during the operation of the compressor system.

In a further optional embodiment of the method according to the present invention, it may be provided that the appropriate setting of the entry temperature $T_{Ri}$ is performed as a function of an acquired pressure dewpoint of the compressed gas, which is output from the drying sector. In this way, a particularly simple and reliable regulating capability is provided.

Furthermore, in a preferred refinement, the method according to the present invention may provide that the degree of opening of the bypass line is limited in consideration of maximum permissible operating temperatures of the components through which compressed gas flows downstream of the bypass line, in particular the last compressor and/or downstream components. The gas stream guided via the bypass line is thus to be limited if otherwise established temperature limits at predefined points upstream or downstream of the bypass line in the compressor system or in a gas system arranged downstream would be exceeded. A direct effect also results upstream of the bypass line: a higher entry temperature at the last compressor causes a higher pressure between the last compressor and the next-to-last compressor. The next-to-last compressor thus also has to compress a higher pressure, however, and has to perform more work as a result of the higher pressure ratio. The exit temperature of the next-to-last compressor thus also rises.

The limiting of the degree of opening of the bypass line may change depending on the given specific external factors and is thus considered to be variable. It is possible to specify the degree of opening as an actual specified value, for example, in percent, wherein the limiting of the degree of opening is never always performed at the same value in this case, but rather is dependent on the ambient conditions. However, it is also possible that the degree of opening is not controlled or regulated via a fixed value, but rather control commands are only transmitted to the setting element to enlarge the degree of opening or reduce the degree of opening. With regard to the operating temperature or operating temperatures of a component, it is to be noted that one operating temperature or also multiple operating temperatures may be defined for an individual component, for example, for a compressor, a maximum gas entry temperature as a first value of a maximum permissible operating temperature, a maximum permissible gas exit temperature as a second value of a maximum operating temperature, and/or, for example, a maximum mean value of a gas entry temperature and a gas exit temperature as a third value of a maximum operating temperature.

In one preferred refinement, the degree of opening of the bypass line may be set via a setting element having electrical, pneumatic, or hydraulic drive, preferably having a motorized drive.

The ascertainment of a specified value $T_V$ for the regeneration entry temperature $T_{Ri}$ will be described hereafter:

An important variable of the drying procedure is the drying entry temperature; i.e., the temperature of the gas at which the gas enters the drying sector of the adsorption dryer, or a temperature characteristic thereof. This temperature may be measured at any arbitrary point between a regeneration gas cooler, through which flow last occurs before entry into the drying sector, and the drying sector.

On the basis of the drying entry temperature, the control unit ascertains a specified value $T_V$ for the regeneration entry temperature $T_{Ri}$. The setting element is activated so that this specified value $T_V$, as long as the next-to-last compressor and the last compressor compressed gas, is not substantially undershot, with the exception of startup procedures, during which the compressors first have to heat up until the regeneration entry temperature $T_{Ri}$ may reach or exceed the specified value $T_V$. The setting element remains closed if the specified value $T_V$ is not undershot even without flow through the bypass line. The power consumption of the compressor system is thus only increased appropriately, i.e., only when it is required for sufficient drying, and then also only to the extent to which it is required.

The described overall system is thus very energy-efficient. Instead of the drying entry temperature, other temperatures could also be used, which influence the drying entry temperature or are influenced there by, for example:

the temperature of the coolant medium of the regeneration gas cooler, through which flow last occurs before entry into the drying sector, the temperature of the gas in an after the exit from the drying sector, and/or the temperature of the adsorption material in the drying sector.

Another important variable of the drying procedure is the pressure dewpoint after the exit from the drying sector. If this pressure dewpoint, which may be acquired via the above-mentioned pressure dewpoint sensor, is excessively high, the setting element may be opened further, in contrast, if it is significantly lower than required, the setting element may be closed further. Alternatively, a specified value $T_V$ for the regeneration entry temperature $T_{Ri}$ may also be changed accordingly; i.e., increased if the pressure dewpoint is excessively high and lowered if it is excessively low. The setting element is then activated so that the specified value $T_V$ for the regeneration entry temperature $T_{Ri}$ is not undershot. Instead of a pressure dewpoint sensor, another variable which characterizes the water content of the gas stream may also be used.

It is to be noted in this case that an increase of the regeneration entry temperature $T_{Ri}$ may first have an effect on the pressure dewpoint when the adsorption material regenerated at this regeneration entry temperature $T_{Ri}$ is used for drying the gas. Therefore, a time delay between regeneration and drying has to be taken into consideration. The control unit therefore advantageously interacts with the above-mentioned data memory to store measured values of different points in time and use them for the activation of the setting element or for determining the specification for the regeneration entry temperature $T_{Ri}$. Thus, for the adsorption material located at a point in time in the drying sector, which is relevant for the pressure dewpoint reached at this point in time, the regeneration entry temperature values may be taken into consideration which were present during the regeneration of this adsorption material, to ascertain the specified temperature $T_V$. More stable regulation of the pressure dewpoint is thus possible.

For optimum consideration of the temperature and pressure dewpoint values during the ascertainment of the specified value $T_V$, it is advantageous to know the length of the cycle, after which the adsorption chamber is again in the starting position in relation to the regeneration and drying sector. The length of a cycle may be ascertained if the velocity of the relative movement of the adsorption chamber is provided as a value in the control unit. This is achieved, for example, in that a control signal is generated by the control unit for the motorized drive of the adsorption chamber of the adsorption dryer, which is designed as a rotation dryer, and/or the motorized drive transmits a corresponding signal with respect to the movement to a corresponding signal input of the control unit.

Particularly stable regulation may be achieved if signal inputs are provided on the control unit both for the acquired present pressure dewpoint and also for the drying entry temperature. Thus, in the event of an increase of the drying entry temperature, the specified value $T_V$ for the regeneration entry temperature $T_{Ri}$ may be raised immediately. In this way, no (or only minor) increase of the pressure dewpoint occurs, since a change of the specified value $T_V$ may be performed before the pressure dewpoint signal supplies a value above the established limiting value for the pressure dewpoint. If the pressure dewpoint signal nonetheless exceeds the established limiting value for the pressure dewpoint, for example, because of other influences, such as increase of the relative humidity and temperature of the intake gas of the compressor system, this still only results in a small change of the specified value $T_V$. The established limiting value for the pressure dewpoint is thus not exceeded with a high level of reliability.

In compressors having variable intake volume stream (for example, compressors having variable speed), the drying entry temperature also varies with the intake volume stream. With a low intake volume stream, a low drying entry temperature results. Therefore, only a lower regeneration entry temperature $T_{Ri}$ would be required for the drying of the low intake volume stream. However, if the intake volume stream is increased starting from a low intake volume stream and the drying entry temperature thus also increases, the regeneration entry temperature $T_{Ri}$ previously ascertained on the basis of the drying entry temperature with low intake volume stream would be excessively low for sufficient drying.

It may therefore be advantageous, in the case of low intake volume streams, to already establish, as the specified value for the regeneration entry temperature $T_{Ri}$, the value which results from the drying entry temperature which is achieved in the case of a high intake volume stream. This may be approximately calculated by the control unit, if the information about the present and the maximum intake volume stream is available for the control unit. This is achieved in that the drive for the compressors of the compressor system is activated via a signal output of the control unit and/or a signal input is provided, on the basis of which the present intake volume stream may be ascertained. This may be, for example, signals for the frequency of the rotating field generated by a frequency rectifier, using which the drive for the compressors is operated.

The described variables partially act only with a delay on the pressure dewpoint. It is therefore advantageous if the stored operational data of earlier points in time may be used for the ascertainment of the specified value $T_V$. Operational data of the adsorption dryer, which are stored in the data memory interacting with the control unit and may be used for the activation of the actuator of the setting element or for ascertaining the specified value for the regeneration entry temperature $T_{Ri}$, are:

regeneration entry temperature $T_{Ri}$ or exit temperature $T_{Al}$ of the gas from the last compressor, drying entry temperature, drying exit temperature, pressure dewpoint after drying, velocity of the adsorption chamber or a measure of the rotational velocity of the adsorption dryer, which is designed as a rotation dryer, intake volume stream of the compressor system or another variable which characterizes the gas mass stream to be dried, and/or time since last start of the gas delivery A further improvement of the drying process is achieved if a condensate separator and a condensate drain are provided between the gas exit from the intercooler and the unification with the bypass line.

Because both the gas entry temperature and also the gas exit temperature of the last compressor are increased by the described measures, load limits of the next-to-last compressor, the last compressor, or downstream components could be exceeded. To avoid this, a signal input for the gas entry temperature of the last compressor and/or signal inputs for the gas pressures before and/or after the last compressor are provided in the control unit. On the basis of this signal or these signals, the specified value $T_V$ for the regeneration entry temperature $T_{Ri}$ may be determined so that the load limits of the next-to-last compressor, the last compressor, and/or downstream components are reliably maintained.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 1b shows a compressor system for compressing gases in a two-stage compression according to a second embodiment of the present invention;

FIG. 4b show an illustration of the additional power consumptions for the two overall systems B and C of the example illustrated on the basis of FIG. 4a.

DETAILED DESCRIPTION OF THE INVENTION

Figure 1A:
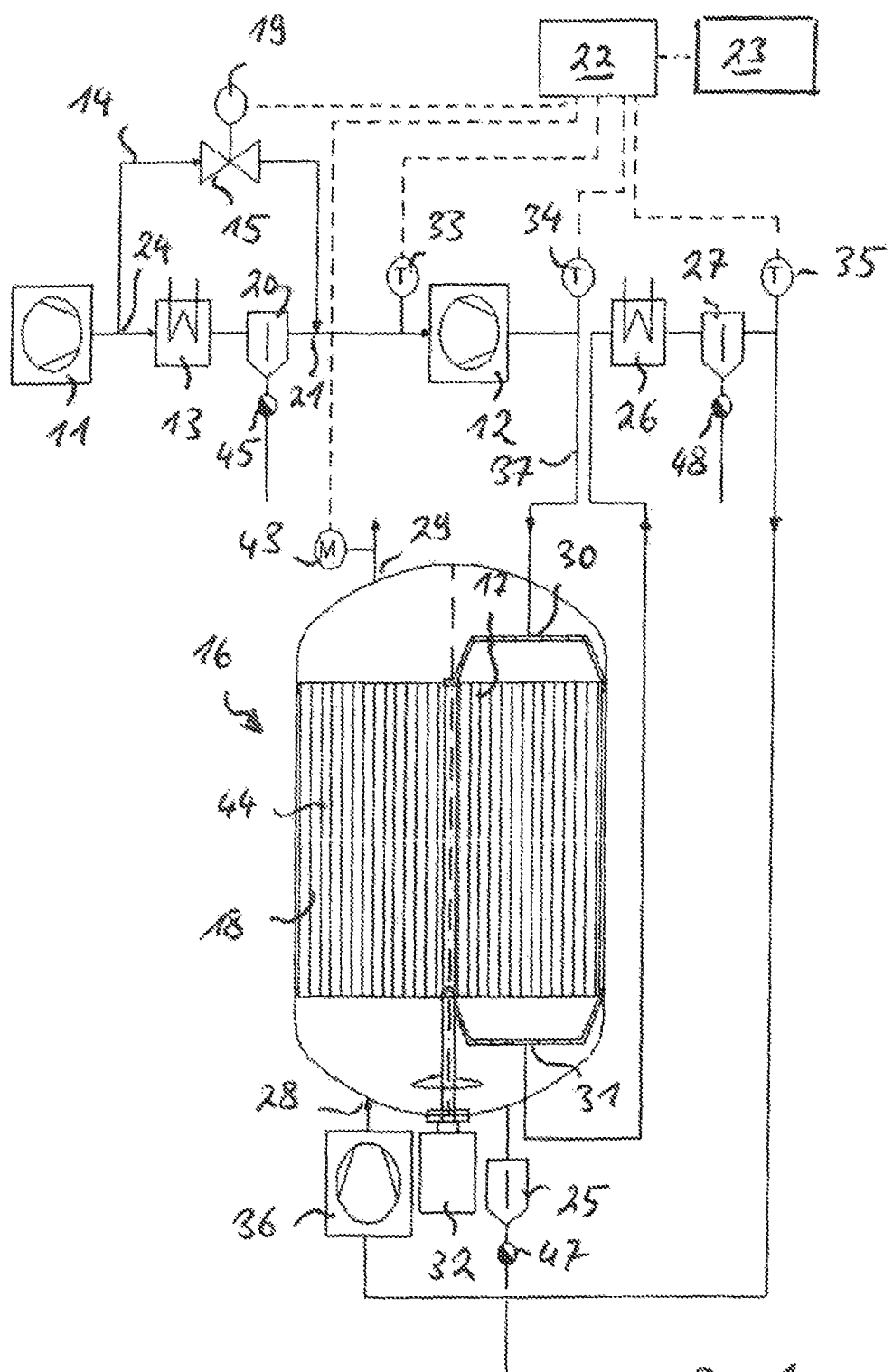
FIG. 1a shows a compressor system for compressing gases in a two-stage compression according to a first embodiment of the present invention.
Figure 16:
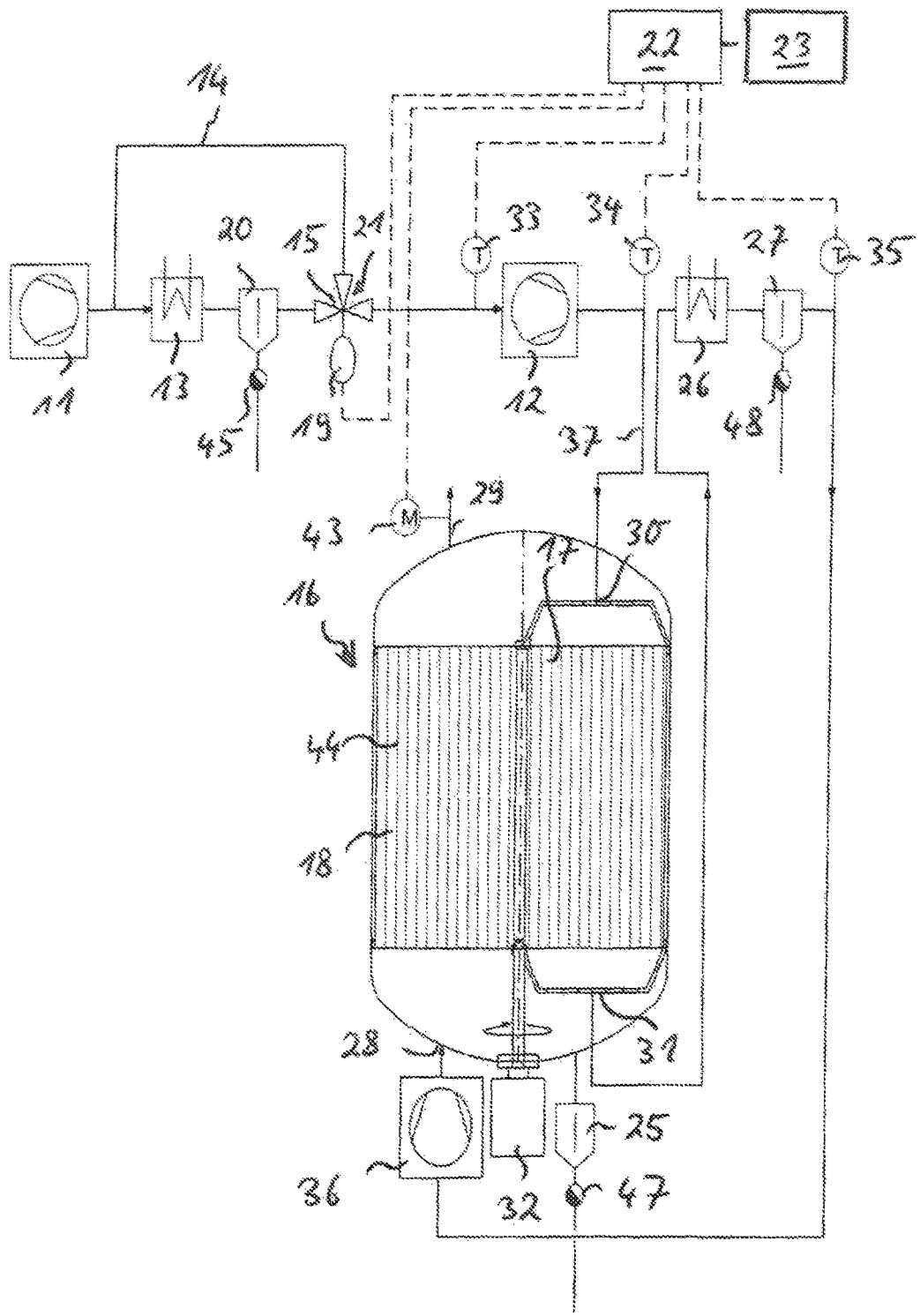

FIG. 1a shows a compressor system for compressing gases in a two-stage compression according to a first embodiment of the present invention. The compressor system comprises an upstream (next-to-last) compressor 11, which represents the lowest compressor stage in the present embodiment, and a last compressor 12, which represents the highest compressor stage in the present embodiment. Overall, as mentioned, the present embodiment is a compressor system having two-stage compression.

In general, the compressor system according to the present invention or the method according to the present invention may be operated using different gases. In many applications, however, the gas to be compressed is an air or the compressed gas is compressed air. Thus, the exemplary embodiments are also explained hereafter on the basis of FIGS. 1a to 3 with reference to the exemplary case in which the gas to be compressed represents air.

An intercooler 13 is arranged between next-to-last compressor 11 and last compressor 12 and a condensate separator 20 and a condensate drain 45 are arranged downstream of the intercooler 13. Cold, in particular a cold fluid, such as cold water or ambient air, may be applied to the intercooler 13 and it may thus cool down the compressed air supplied thereto from the upstream compressor 11.

The cooling of the compressed air which is compressed in the upstream compressor 11 is offered because of multiple considerations under certain circumstances. On the one hand, heating to a temperature which is greater than a permissible operating temperature for the last compressor or for connected components is to be prevented in downstream compressor stages, specifically in the last compressor 12 here. On the other hand, cooler air has a higher density and may therefore be further compressed more energy efficiently than heated air. With regard to the energy efficiency, it may therefore also be advantageous to cool down compressed air which is compressed in an upstream stage, specifically in the upstream compressor 11 here.

If the compressed air in the intercooler 13 is cooled down beyond its pressure dewpoint, the moisture contained therein condenses out. This moisture, in particular the water contained in the compressed air, may be discharged via the above-mentioned condensate separator 20 and the condensate drain 45. The compressed air which is compressed in the upstream compressor 11 may thus also be dried by the intercooler 13 and the condensate separator 20 upon cooling below the dewpoint.

It is provided according to the present invention that a bypass line 14 is provided, which bypasses the intercooler 13. The bypass line 14 thus extends between a branching point 24 between the upstream compressor 11 and the intercooler 13 and a unification point 21, which is arranged between the condensate separator 20 and the last compressor 12. A setting element 15 is provided inside the bypass line 14, which is specifically designed here as a proportional valve, which may be actuated via an actuator 19. The actuator 19—which is electrically driven, for example—may be activated by a control unit 22, so that a continuous setting of the setting element 15, specifically the proportional valve, is possible as occasioned by the control unit 22.

An adsorption dryer 16, which is designed here as a rotation dryer, is arranged downstream of the last compressor 12. The adsorption dryer, which is designed as a rotation dryer, comprises a regeneration sector 17 and a drying sector 18. The rotation dryer, which is designed as an adsorption dryer, may also comprise still further sectors, however, for example, a cooling sector or also multiple regeneration sectors or multiple drying sectors.

The adsorption dryer 16 is connected via a connecting line 37 to the last compressor 12 such that the entire compressed gas stream is firstly guided to an inlet 30 of the regeneration sector 17, subsequently through the regeneration sector 17 and from an outlet 31 of the regeneration sector 17 subsequently to the drying sector 18. At the drying sector 18, the compressed air moves from an inlet 28 of the drying sector 18 through it and is provided at an outlet 29 of the drying sector. All of the hot compressed air from the last compressor 12 flows via a connecting line 37 to the regeneration sector 17 of the adsorption dryer 16.

Inside the housing section of the adsorption dryer 16, in which the regeneration sector 17 and the drying sector 18 are defined, a first dryer-side condensate separator 25 having a first dryer-side condensate drain 47 is arranged, to discharge water which arises at the entry of the drying sector, for example, due to cooling of the moist air when the compressor system is at a standstill. Furthermore, a regeneration gas cooler 26 is provided in the flow direction of the compressed gas between the regeneration sector 17 and the drying sector 18, on which a second dryer-side condensate separator 27 having a second dryer-side condensate drain 48 adjoins. To provide an equal or preferably higher pressure at the inlet of the drying sector 18 than at the outlet of the regeneration sector 17, a pressure elevating unit 36 may also be provided between the second dryer-side condensate separator 27 and the inlet 28 into the drying sector 18.

The control unit 22 is also operationally connected to a data memory 23 for the operational data of the adsorption dryer 16. The control unit 22 is also operationally connected to a motorized drive 32 of the adsorption dryer 16 and to further sensors, which provide information about the state conditions of the compressed air in the compressed air system, specifically it is operationally connected to a first temperature sensor 33, a second temperature sensor 34, and a third temperature sensor 35. The first temperature sensor 33 is provided downstream of the unification point 21 and upstream of the last compressor 12 and therefore acquires the temperature of the compressed air before entry into the last compressor 12. The second temperature sensor 34 is arranged between last compressor 12 and the inlet 30 into the regeneration sector 17 and therefore acquires the temperature of the compressed air after the last compressor 12. The third temperature sensor 35 is provided after the second dryer-side condensate separator 27 and before the pressure elevating unit 36, therefore simultaneously also before the inlet 28 into the drying sector 18.

By acquiring the temperatures before the inlet 28 into the drying sector 18 or before the inlet 30 into the regeneration sector 17 and before the inlet into the last compressor 12, the temperature may be controlled via the setting element so that an optimum regeneration entry temperature $T_{Ri}$ is provided. This is simultaneously monitored using the second temperature sensor 34.

Alternatively or additionally to the first temperature sensor 33, the second temperature sensor 34, or the third temperature sensor 35, a pressure dewpoint sensor 43 may also be provided at the outlet 29 of the drying sector 18 of the adsorption dryer 16. The pressure dewpoint sensor 43 ascertains a present pressure dewpoint of the compressed air output at the drying sector 18. If the pressure dewpoint of the output compressed air approaches the fixed limiting value for the pressure dewpoint, measures are taken immediately, specifically action is taken on the setting element 15 such that a previously determined limiting value $GW_\tau$ for the pressure dewpoint is maintained with sufficient reliability. Specifically, it may be provided that if the present pressure dewpoint of the compressed air output at the drying sector 18 increases in the direction of the limiting value of the pressure dewpoint, the bypass line 14 is opened via the setting element 15 such that the regeneration entry temperature rises and, while accepting an additional power consumption due to higher regeneration entry temperatures, improved drying of the compressed air is achieved, so that exceeding the established pressure dewpoint is prevented with sufficient reliability.

FIG. 1b shows a compressor system for compressing gases in a two-stage compression according to a second embodiment of the present invention. This second embodiment of a compressor system substantially corresponds to the construction of the embodiment of a compressor system illustrated on the basis of FIG. 1a, and only differs from the embodiment illustrated in FIG. 1 a in that the setting element 15 at the end of the bypass line 14 in the unification point 21 is designed as a mixing valve. The setting element 15 designed as a mixing valve may thus set the partial stream guided via the bypass line 14 and the partial stream guided via the intercooler 13 and at the same time may also completely block, on the one hand, the partial stream guided via the bypass line 14 and, on the other hand, also the partial stream guided via the intercooler 13. The setting element 15 designed as a mixing valve may also be actuated here via an actuator 19, so that the electrically driven actuator, for example, may be activated by the control unit 22.

Figure 1C:
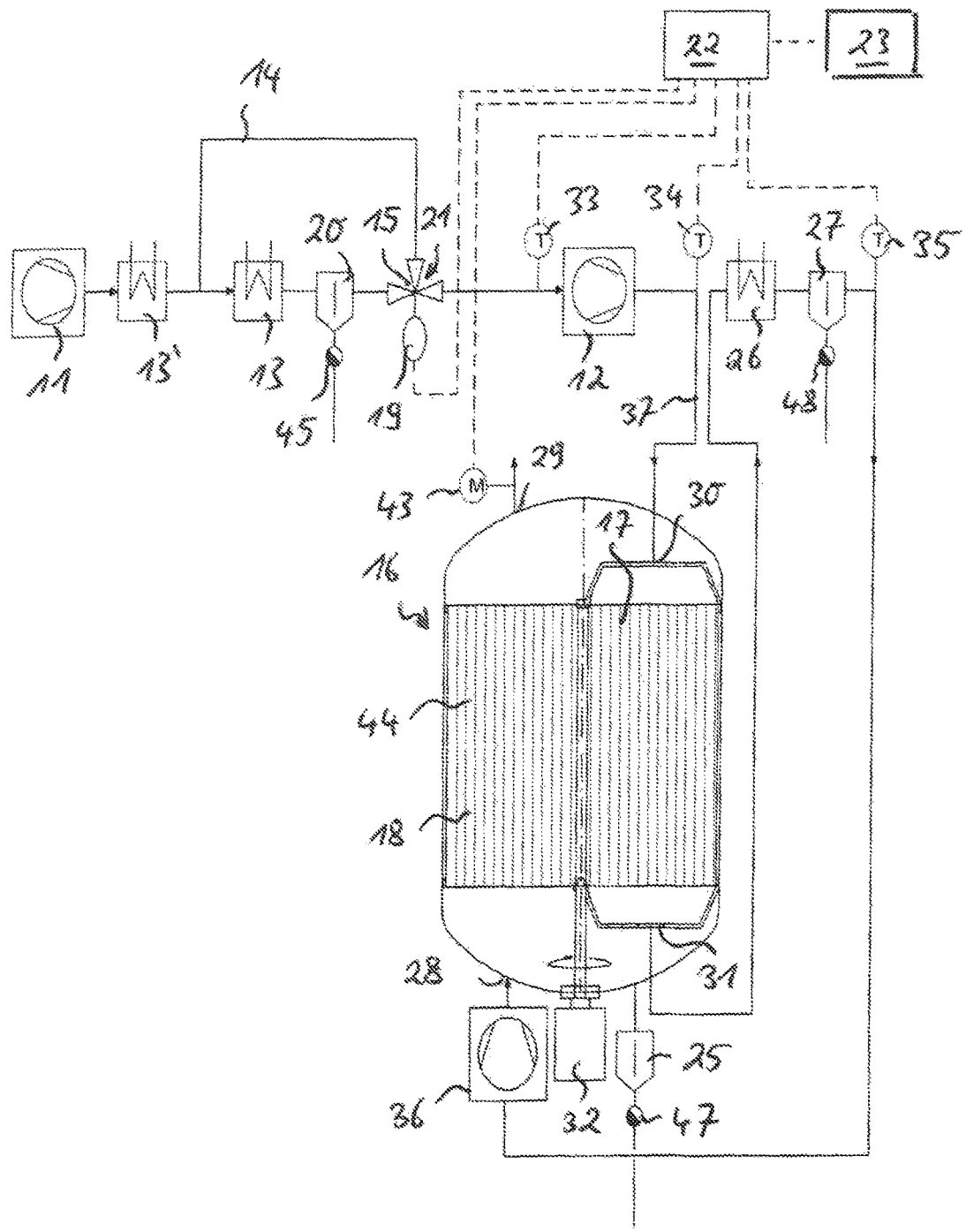
FIG. 1c shows a compressor system for compressing gases in a two-stage compression according to a third embodiment of the present invention.

FIG. 1c shows a compressor system for compressing gases in a two-stage compression, according to a third embodiment of the present invention, which differs from the embodiment illustrated by FIG. 1b in that the above-mentioned intercooler 13 is designed as a last intercooler between next-to-last compressor 11 and last compressor 12 and an intercooler upstream thereof is designed as next-to-last intercooler 13'. The bypass line 14, however, only bypasses the last intercooler 13, viewed in the flow direction, between next-to-last compressor 11 and last compressor 12 in the present embodiment, but not, in contrast, next-to-last intercooler 13' between next-to-last compressor 11 and last compressor 12. Also here—corresponding to the embodiment according to FIG. 1b —the setting element 15 is designed as a mixing valve, which is provided in the unification point 21 and thus causes setting of the partial stream is guided via the bypass line 14 or the intercooler 13. In particular, the partial stream guided via the intercooler 13 or the partial stream guided via the bypass line 14 may be completely blocked. The setting element 15, which is designed as a mixing valve, may be actuated by means of an actuator 19, which may be activated by the control unit 22, for example.

Figure 2:
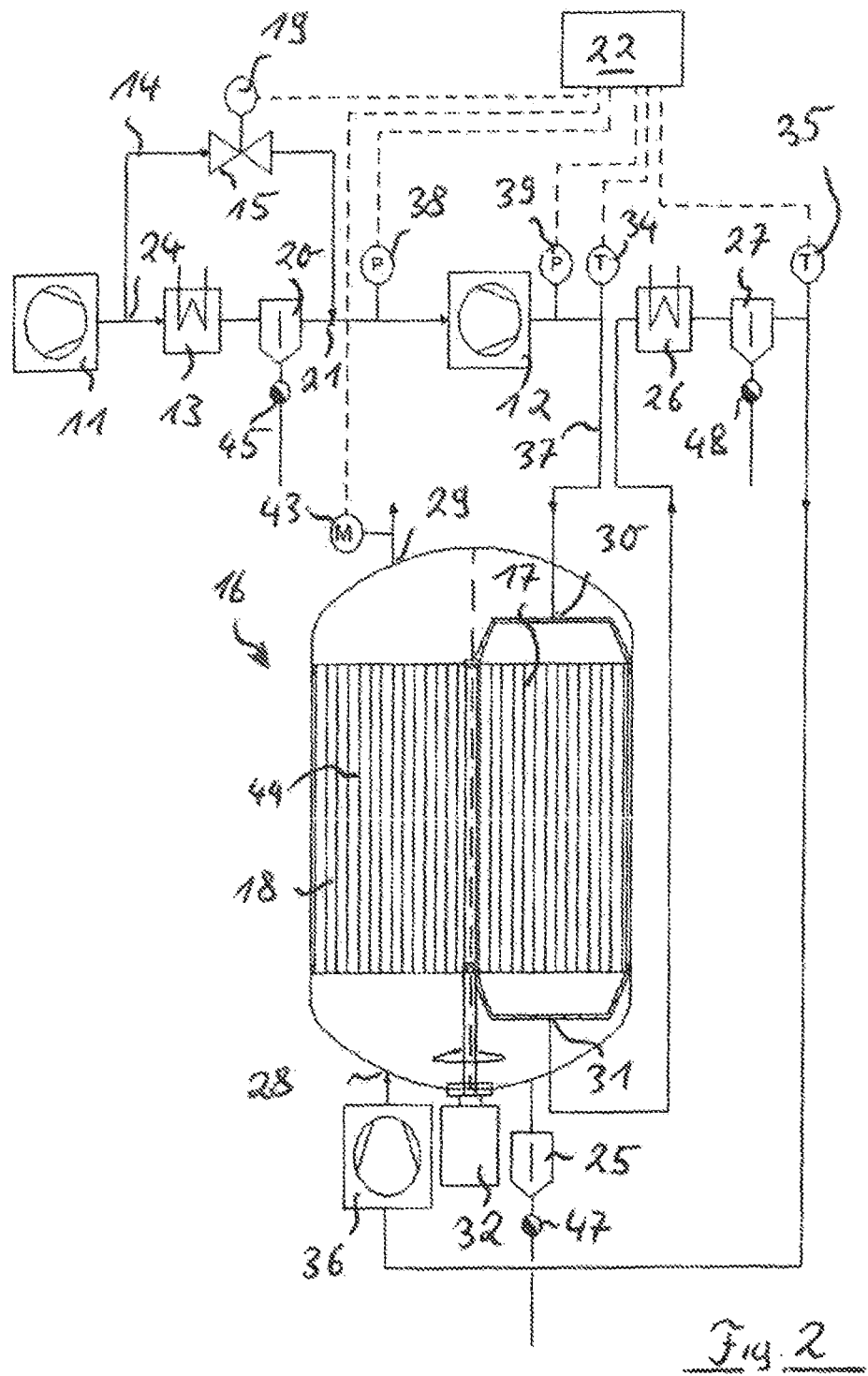
FIG. 2 shows a compressor system for compressing gases in a two-stage compression according to a further embodiment of the present invention.

FIG. 2 shows an another embodiment of a compressor system for compressing gases in a two-stage compression. This compressor system substantially corresponds to the construction of the embodiment of a compressor system illustrated on the basis of FIG. 1a, and only differs from the embodiment illustrated on the basis of FIG. 1a in that instead of the first temperature sensor 33 in the embodiment according to FIG. 1a, a first pressure measuring sensor 38 and a second pressure measuring sensor 39 are provided. The first pressure measuring sensor 38 is arranged in this case between the next-to-last compressor 11 and the last compressor 12, in particular between the unification point 21 and the last compressor 12, and thus acquires the entry pressure of the last compressor 12. The second pressure measuring sensor 39 is provided on the outlet side of the last compressor 12, specifically upstream or downstream of the second temperature sensor 34 or at the same position as the second temperature sensor 34. First pressure measuring sensor 38 and second pressure measuring sensor 39 are operationally connected to the control unit 22 and transfer the acquired pressure values to the control unit 22.

The entry temperature of the last compressor 12 may be approximately ascertained from the pressure ratio between entry pressure of the last compressor 12 and exit pressure of the last compressor 12 and the exit temperature of the last compressor 12 acquired via the second temperature sensor 34.

Figure 3:
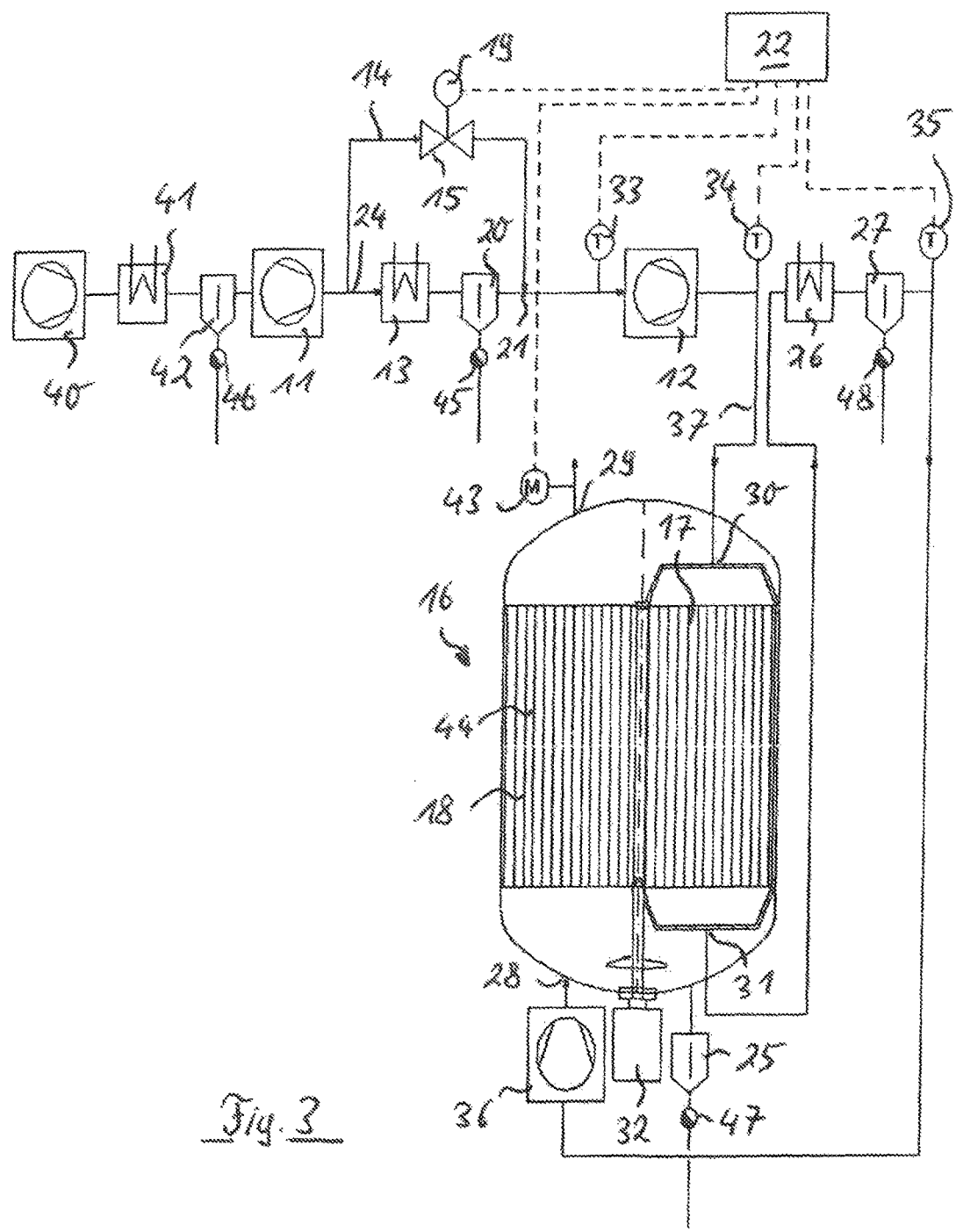
FIG. 3 shows a compressor system for compressing gases in a three-stage compression an further embodiment of the present invention.

FIG. 3 shows another embodiment of a compressor system for compressing gases in a three-stage compression. The flow chart of the embodiment illustrated in the embodiment according to FIG. 3 differs from the flow chart of the embodiment as was illustrated on the basis of FIG. 1 only in that before the upstream compressor 11, an additional lower compressor stage is also provided as inlet compressor 40 and a second intercooler 41, a second condensate separator 42, and a second condensate drain 46 are also provided between the inlet compressor 40 and the upstream compressor 11.

Figure 4A:
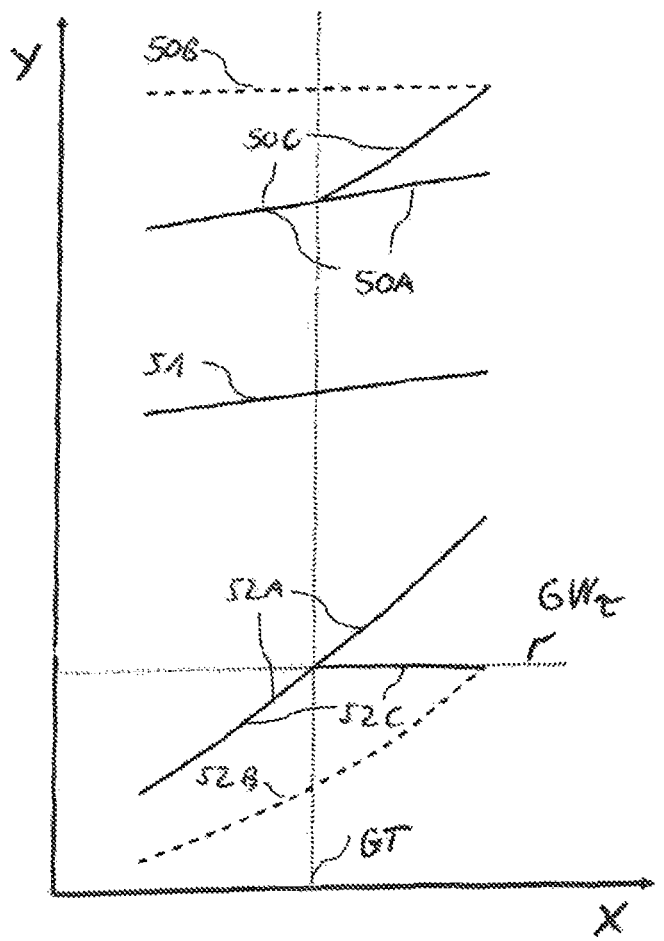
FIG. 4a shows a diagram demonstrating the relationships between temperatures and dewpoints in a comparison between a system or method according to the present invention and a system or a method according to the prior art.

FIG. 4a shows a graph to explain the relationships between temperatures and dewpoints in the comparison between a system or method according to the present invention and a system or a method, respectively, according to the prior art. Specifically, gas temperatures and pressure dewpoints at the outlet of the drying sector (y axis) are shown therein as a function of the coolant medium temperature (x axis).

In this example illustrated on the basis of FIG. 4a, the coolant medium temperature is the temperature at which the coolant medium enters the overall system. The coolant medium thus enters at this temperature in parallel in the intercooler 13 and the regeneration gas cooler 26. The qualitative statements apply just the same, however, if the coolant medium flows through the intercooler 13 and the regeneration gas cooler 26 sequentially, since also in this case, an increase of the coolant medium temperature, at which the coolant medium enters the overall system, results in an increase of the gas exit temperature of these two coolers, i.e., the intercooler 13 and the regeneration gas cooler 26.

For the examples shown, gas pressures, intake gas stream of the compressors, and relative humidity of the intake gas are assumed to be constant. An overall system A, in which no measures are carried out to influence the regeneration entry temperature $T_{Ri}$, an overall system B, in which the regeneration entry temperature $T_{Ri}$ is regulated to a constant, sufficiently high value, and an overall system C having the appropriate regulation according to the present invention of the regeneration entry temperature $T_{Ri}$ are observed. The curve 51 represents the curve of the drying entry temperature (which may be acquired via the third temperature sensor 35). This curve is identical in all three observed cases A, B, and C and increases with the coolant medium temperature.

The curve 50A indicates the temperature curve of the regeneration entry temperature $T_{Ri}$ for the overall system A. It extends approximately in parallel to the drying entry temperature. The pressure dewpoint curve 52A of the overall system A increases continuously and in this example exceeds the limiting value $GW_\tau$ for the pressure dewpoint at a limiting temperature GT.

For overall system B, in which the regeneration entry temperature $T_{Ri}$ according to curve 50B is kept at a constant high value, the pressure dewpoint 52B is kept below the limiting value $GW_\tau$. However, it is decreased in the entire observed temperature interval of the coolant medium, so that unnecessarily low pressure dewpoints are reached. Because of this, there is a substantial difference between the constant regeneration entry temperature B and the regeneration entry temperature $T_{Ri}$ 50A of the overall system A in the entire operating range. For higher regeneration entry temperatures, a higher power consumption of the overall system is required. Overall system B having constant regeneration entry temperature therefore has a substantially higher power consumption in the entire operating range than the overall system A.

In overall system C having the appropriate regulation according to the present invention of the regeneration entry temperature $T_{Ri}$, the regeneration entry temperature $T_{Ri}$ (line 50C) is only higher for coolant media temperatures above the limiting temperature GT in comparison to overall system A and is also only sufficiently higher that the limiting value $GW_\tau$ for the pressure dewpoint is not exceeded here. The curve 50C of the regeneration entry temperature $T_{Ri}$ in the overall system C is significantly below the curve 50B with constant regulation. The overall power demand is thus less and the method is substantially more energy-efficient.

Figure 4B:
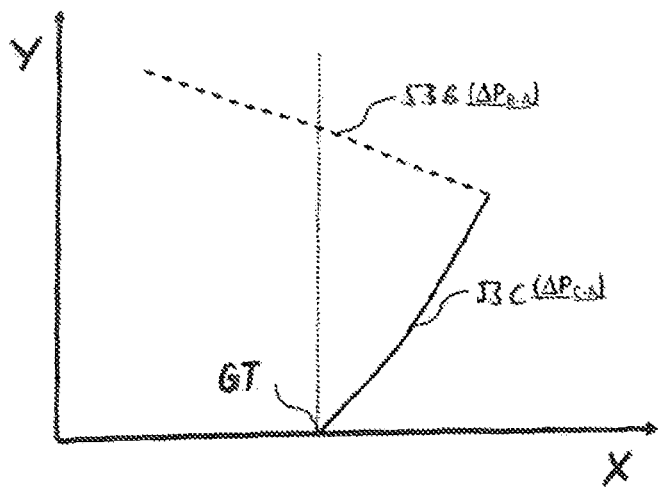

For the example observed in FIG. 4a, the additional power consumptions (y axis) of the two overall systems B and C in relation to the overall system A are shown in FIG. 4b as a function of the coolant medium temperature (x axis), i.e., the difference between the power consumption which the overall system B or C has, and the power consumption which the system A has with identical operating conditions.

Line 53B shows the additional power consumption $\Delta P_{B-A}$ of the overall system B, and line 53C shows the additional power consumption $\Delta P_{C-A}$ of the overall system C. In the observed operating range, in the case of the overall systems B and C, as shown in FIG. 4a, the limiting value $GW_\tau$ for the pressure dewpoint is not to be exceeded. The constant specified value for the regeneration entry temperature $T_{Ri}$ was therefore set sufficiently high that the limiting value $GW_\tau$ is just reached at the highest coolant medium temperature of the observed operating range and therefore in the most unfavorable case. At this point, the systems B and C, as shown in FIG. 4a, have the same regeneration entry temperature $T_{Ri}$ and the same pressure dewpoint and thus also the same additional power consumption.

In overall system B, the additional power consumption is all the higher, however, the lower the coolant medium temperature is. This is because in the overall system B, the energetic advantages which these lower coolant medium temperatures cause in the overall system A are not used. With lower coolant medium temperatures, in the comparative system A, an energetically advantage low gas entry temperature of the highest compressor stage is caused, in the overall system B, for example, the gas entry temperature is artificially elevated by the regulation, so that no energetic improvement is achieved by lower coolant medium temperatures.

In the overall system C, the additional power demand $\Delta P_{C-A}$ is lower the lower the coolant medium temperature, since the specified value for the regeneration entry temperature $T_{Ri}$ is lowered appropriately in the case of lower regeneration entry temperatures $T_{Ri}$. Below the limiting temperature GT, in the overall system A, the limiting value $GW_\tau$ for the pressure dewpoint is undershot (cf. FIG. 4a). It is therefore not necessary in this range for the regeneration entry temperature $T_{Ri}$ to be increased. In the appropriate regulation of the overall system C, a higher regeneration entry temperature $T_{Ri}$ is therefore not determined as the specified value below the limiting temperature GT than that which is present in the overall system A, i.e., the setting element 15 keeps the bypass line 14 closed. Therefore, there is no additional power consumption below the limiting temperature GT in the overall system C.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A compressor system for compressing gases in a multistage compression, the compressor system comprising:
   multiple compressors (11, 12) connected in series, the multiple compressors (11, 12) comprising at least one next-to-last compressor (11) in a flow direction and a last compressor (12) which defines a highest compressor stage within the multistage compression;
   one or more intercoolers (13) between the at least one next-to-last compressor (11) and the last compressor (12); and
   an adsorption dryer (16) connected downstream of the last compressor (12), the adsorption dryer (16) being designed as a rotation dryer having a rotating adsorption chamber (44), an inside of the adsorption chamber comprising a regeneration sector (17) and a drying sector (18),
       wherein the regeneration sector (17) is connected to the last compressor (12) such that a compressed gas stream output from the last compressor (12) is guided according to a full stream principle through the regeneration sector (17) of the adsorption dryer (16), and
       wherein a bypass line (14) which bypasses the one or more intercoolers (13) is situated between the at least one next-to-last compressor (11) and the last compressor (12) and a setting element (15) is provided in the bypass line (14), to be able to set a gas stream guided via the bypass line (14) and therefore a regeneration entry temperature of a compressed gas in the regeneration sector (17) appropriately.

2. The compressor system according to claim 1, wherein the next-to-last compressor (11) is the first compressor in the flow direction and the multiple compressors (11, 12) are connected in succession to achieve a two-stage compression.

3. The compressor system according to claim 1 wherein the setting element (15) is designed for at least one of continuous or steady setting of the gas stream, step-by-step setting of the gas stream, and appropriate complete blocking and/or opening of a line cross section of the bypass line (14) associated with the setting element (15).

4. The compressor system according to claim 1, wherein the setting element (15) is coupled to an actuator (19) which is designed for electrical, pneumatic, or hydraulic actuation of the setting element.

5. The compressor system according to claim 4, wherein the actuator is driven by a motor.

6. The compressor system according to claim 1, wherein a condensate separator (20) is provided and arranged downstream of the one or more intercoolers (13) and upstream of a unification point (21), at which the gas stream guided via the bypass line (14) is unified with a gas stream guided via the one or more intercoolers (13) before entry into the last compressor (12).

7. The compressor system according to claim 1, further comprising a controller (22) which is operationally connected to the setting element (15) or an actuator (19) associated with the setting element (15), to act on the setting element (15) appropriately, in particular as a function of the present state data of the gas to be compressed or the compressed gas.

8. The compressor system according to claim 7, wherein the controller (22) comprises one or more signal inputs selected from the group consisting of a signal input for an exit temperature at or downstream of the last compressor (12), a signal input for at least one signal associated with the drying process, a signal input for at least one signal associated with the compression process of the last compressor (12), a signal input for at least one signal associated with the compression process of the next-to-last compressor, a signal input for a speed of one or more compressors (11, 12), and a signal input for a speed of the adsorption chamber (44).

9. The compressor system according to claim 7 further comprising a pressure dewpoint sensor (43) which is designed to acquire a pressure dewpoint of the compressed gas output at the drying sector (18) and is operationally connected to the controller (22) such that the setting element (15) is settable via the controller (22) as a function of the pressure dewpoint of the compressed gas output at the drying sector (18).

10. The compressor system according to claim 1, wherein the controller (22) is operationally connected to a data memory (23) for operational data of the adsorption dryer (16).

11. The compressor system according to claim 7, wherein the controller (22) is also operationally connected to the multiple compressors (11, 12) and activates the multiple compressors (11, 12), in particular sets a speed thereof and/or acquires operational data thereof.

12. A method for operating a compressor system for achieving a multistage compression, the compressor system comprising multiple compressors (11, 12) connected in series, the multiple compressors (11, 12) comprising a next-to-last compressor (11) in a flow direction and a last compressor (12) which defines a highest compression stage within the multistage compression, the compressor system further comprising an adsorption dryer (16) connected downstream of the last compressor (12) which is designed as a rotation dryer and comprises a regeneration sector (17) and a drying sector (18), a gas stream outlet from the last compressor (12) being guided in a full stream principle through the regeneration sector (17) of the adsorption dryer (16), the method comprising:

setting a regeneration entry temperature of compressed gas in the regeneration sector (17), via setting of a degree of opening of a bypass line (14), the bypass line (14) entirely or partially bypassing one or more intercoolers (13) provided between the next-to-last compressor (11) and the last compressor (12).

13. The method according to claim 12, wherein the regeneration entry temperature in the regeneration sector (17) is set such that compressed gas exiting from the drying sector (18) maintains an established minimum limiting value for a degree of drying or a pressure dewpoint of the compressed gas exiting from the drying sector (18) does not exceed an established limiting value for the pressure dewpoint.

14. The method according to claim 13, wherein the limiting value for the pressure dewpoint is set by a user to a constant value or is established depending on an application.

15. The method according to claim 12, wherein setting of the regeneration entry temperature in the regeneration sector is performed as a function of specific state data of a gas to be compressed or a compressed gas.

16. The method according to claim 12, wherein setting of the entry temperature is performed as a function of an acquired pressure dewpoint of the compressed gas exiting from the drying sector (18).

17. The method according to claim 12, wherein the degree of opening of the bypass line is limited based on maximum permissible operating temperatures of components through which compressed gas flows downstream of the bypass line (14).

18. The method according to claim 12, wherein the degree of opening of the bypass line is set via a setting element having electrical, pneumatic, or hydraulic drive.

* * * * *